US008833645B2

(12) United States Patent
Stretch et al.

(10) Patent No.: US 8,833,645 B2
(45) Date of Patent: Sep. 16, 2014

(54) SYSTEM, APPARATUS AND METHODS FOR AUTOMATICALLY CALCULATING DISCOUNTS FOR PURCHASES FROM MERCHANTS MADE USING A RESERVATION SYSTEM

(75) Inventors: James C. Stretch, El Granada, CA (US); Nicole Granucci, San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 320 days.

(21) Appl. No.: 11/166,473

(22) Filed: Jun. 24, 2005

(65) Prior Publication Data

US 2006/0289631 A1     Dec. 28, 2006

(51) Int. Cl.
| | | |
|---|---|---|
| G06K 5/00 | (2006.01) | |
| G06Q 30/02 | (2012.01) | |
| G06Q 20/06 | (2012.01) | |
| G06Q 10/02 | (2012.01) | |
| G06Q 20/38 | (2012.01) | |

(52) U.S. Cl.
CPC ............ *G06Q 20/06* (2013.01); *G06Q 30/0215* (2013.01); *G06Q 30/0234* (2013.01); *G06Q 10/02* (2013.01); *G06Q 30/0226* (2013.01); *G06Q 20/387* (2013.01)
USPC ........................................................ 235/380

(58) Field of Classification Search
CPC ... G06Q 30/02; G06Q 10/02; G06Q 30/0235; G06Q 30/0236; G06Q 30/0239; G06Q 30/06; G06Q 30/0241; G06Q 30/0601; G06Q 50/12; G06Q 30/0207; G06Q 30/0211; G06Q 30/0224; G06Q 30/0226; G06Q 30/0242
USPC ........................................................ 235/380
See application file for complete search history.

(56) References Cited

U.S. PATENT DOCUMENTS

| | | | |
|---|---|---|---|
| 4,931,932 | A | 6/1990 | Dalnekoff et al. |
| 5,483,444 | A | 1/1996 | Heintzeman et al. |

(Continued)

FOREIGN PATENT DOCUMENTS

| | | |
|---|---|---|
| JP | H09138891 | 5/1997 |
| JP | 2001290991 | 10/2001 |

(Continued)

OTHER PUBLICATIONS

Notification of Transmittal of the International Search Report and the Written Opinion of the International Searching Authority, or the Declaration.

(Continued)

*Primary Examiner* — Thien M Le
*Assistant Examiner* — Tae Kim
(74) *Attorney, Agent, or Firm* — Greenberg Traurig LLP

(57) ABSTRACT

System, apparatus and methods for automatically calculating a discount for a customer offered by a merchant through a reservation system. In one example, a reservation file is provided and contains data relating to a reservation, and transaction data relating to payment card transactions is accessed. One or more elements of the transaction data are compared against one or more elements of the reservation file to determine a match; and based on the match, the discount is electronically calculated based one or more one or more elements of the transaction data and one or more elements of the reservation file. In this way, the discount can be accurately calculated in an automatic fashion. In another embodiment, the customer may opt for a non-cash discount such as airline miles, points, or other rewards, in which case the customer may be provided with such rewards in an amount proportional to the discount.

20 Claims, 8 Drawing Sheets

(56) References Cited

U.S. PATENT DOCUMENTS

| | | | |
|---|---|---|---|
| 5,710,886 A | 1/1998 | Christensen et al. | |
| 5,884,278 A | 3/1999 | Powell | |
| 6,249,772 B1* | 6/2001 | Walker et al. | 705/26 |
| 6,269,343 B1 | 7/2001 | Pallakoff | |
| 6,332,126 B1* | 12/2001 | Peirce et al. | 705/14.25 |
| 6,847,935 B1 | 1/2005 | Solomon et al. | |
| 6,871,183 B2 | 3/2005 | Gilday et al. | |
| 6,915,271 B1 | 7/2005 | Meyer et al. | |
| 6,996,579 B2 | 2/2006 | Leung et al. | |
| 7,072,848 B2 | 7/2006 | Boyd et al. | |
| 7,228,285 B2 | 6/2007 | Hull et al. | |
| 7,318,049 B2 | 1/2008 | Iannacci | |
| 7,555,444 B1* | 6/2009 | Wilson et al. | 705/14.41 |
| 2001/0039514 A1 | 11/2001 | Barenbaum et al. | |
| 2002/0002475 A1* | 1/2002 | Freedman et al. | 705/4 |
| 2002/0062249 A1 | 5/2002 | Iannacci | |
| 2002/0107733 A1 | 8/2002 | Liu et al. | |
| 2002/0156749 A1 | 10/2002 | Sardy | |
| 2002/0165771 A1 | 11/2002 | Walker et al. | |
| 2002/0194069 A1 | 12/2002 | Thakur | |
| 2003/0004761 A1 | 1/2003 | Lampe et al. | |
| 2003/0036929 A1 | 2/2003 | Vaughan et al. | |
| 2003/0097283 A1 | 5/2003 | Kimura et al. | |
| 2003/0101131 A1 | 5/2003 | Warren et al. | |
| 2003/0149602 A1* | 8/2003 | Francis | 705/5 |
| 2003/0177066 A1 | 9/2003 | Zhang | |
| 2003/0229585 A1 | 12/2003 | Butler | |
| 2003/0233276 A1 | 12/2003 | Pearlman et al. | |
| 2003/0233278 A1 | 12/2003 | Marshall | |
| 2004/0024703 A1 | 2/2004 | Roskind | |
| 2004/0034564 A1* | 2/2004 | Liu | 705/15 |
| 2004/0158494 A1* | 8/2004 | Suthar | 705/15 |
| 2004/0186773 A1* | 9/2004 | George et al. | 705/14 |
| 2004/0215517 A1* | 10/2004 | Chen et al. | 705/14 |
| 2005/0114167 A1* | 5/2005 | McEvoy | 705/1 |
| 2005/0189414 A1 | 9/2005 | Fano et al. | |
| 2005/0203782 A1* | 9/2005 | Smith | 705/5 |
| 2005/0228719 A1 | 10/2005 | Roberts et al. | |
| 2006/0004629 A1 | 1/2006 | Neemann et al. | |
| 2006/0053052 A1 | 3/2006 | Baggett et al. | |
| 2006/0118436 A1* | 6/2006 | Lapsker | 206/232 |
| 2006/0208065 A1 | 9/2006 | Mendelovich et al. | |
| 2006/0259335 A1 | 11/2006 | La Macchia et al. | |
| 2006/0259364 A1* | 11/2006 | Strock et al. | 705/14 |
| 2007/0156470 A1 | 7/2007 | Granucci et al. | |
| 2008/0071587 A1 | 3/2008 | Granucci et al. | |
| 2008/0082418 A1 | 4/2008 | Fordyce, III | |
| 2008/0296369 A1 | 12/2008 | Bodington | |

FOREIGN PATENT DOCUMENTS

| | | |
|---|---|---|
| JP | 2002015193 | 1/2002 |
| JP | 2002024728 | 1/2002 |
| JP | 2002074514 | 3/2002 |
| JP | 2004246918 | 9/2004 |
| KR | 1020040062121 | 7/2004 |
| KR | 1020040074765 | 8/2004 |
| KR | 1020040077077 | 9/2004 |
| WO | 2007002296 | 1/2007 |
| WO | 2008042803 | 4/2008 |
| WO | 2008067141 | 6/2008 |
| WO | 2009070463 | 6/2009 |

OTHER PUBLICATIONS

International Patent Application PCT/US06/24317, International Search Report and Written Opinion, mailed May 1, 2007.

European Patent Application No. 07843536.9, Search Report, Nov. 26, 2010.

International Patent Application PCT/US07/79970, International Search Report and Written Opinion, Feb. 26, 2008.

International Patent Application PCT/US07/84153, International Search Report and Written Opinion, Mar. 13, 2008.

International Patent Application PCT/US08/83806, International Search Report and Written Opinion, Jul. 10, 2009.

* cited by examiner

SYSTEM, APPARATUS AND METHODS FOR AUTOMATICALLY CALCULATING DISCOUNTS FOR PURCHASES FROM MERCHANTS MADE USING A RESERVATION SYSTEM

FIELD OF THE INVENTION

This invention relates, in general, to electronic payment systems, and in particular, to methods for processing discounts.

BACKGROUND OF THE INVENTION

Various companies provide reservation services for customers wherein rewards, points, or discounts are provided to the customers if the customers utilize certain credit cards, debit cards, or other preferred payment methods. For instance, dining programs may provide credit cardholders with restaurant reservation services for use with participating restaurants, and if the customer pays the restaurant's bill with a preferred or eligible credit card, then the customer is awarded a dining discount provided by the restaurant when closing the dinner transaction. Other reservation systems (e.g., hotel, airline, etc.) may provide, through affiliations with banks or credit or payment card companies, rewards, points, or other discounts to the customer if the customer utilizes an eligible credit card for payment. In this way, the issuing bank or payment card company benefits by encouraging the customer to utilize its payment cards for the particular transaction; the merchant benefits in that more customers are brought to the merchant's business; and the customer benefits by receiving a discount or other award merely for using an eligible payment card to complete the transaction.

Despite its advantages, conventional reservation discount/award programs may be subject to a number of implementation problems. Although the customer must have an eligible payment card to make a reservation, it is possible that the customer may utilize a non-eligible form of payment to close the transaction and still expect a discount. In programs where a customer is rewarded for dining at a merchant by using an "enrolled" card, the customer is often not aware of the discount or bonus incentive until after they dine, thus cannibalizing the merchant's margins, as these are not incremental diners. Furthermore, there may be little ability to accurately track discounts applied, particularly where the process of rewarding the discounts to the customer is performed by the merchant before the transaction amount is transmitted to the payment card company.

The present inventors have also recognized that some customers may prefer to have their discounts provided to them in forms other than a cash back reward, such as points, miles, or other forms of reward.

Moreover, where a discount is manually processed by a merchant, the possibility for a data entry error or mathematical calculation error exists. In a busy restaurant setting, a reservation discount program may require that restaurant employees calculate the discount given to the customer, and such calculations may be subject to human error from time to time.

As recognized by the present inventors, in some business applications, there is a need to provide participating merchants with a closed-loop capacity efficiency process where distressed or discounted inventory may be served up as an incentive to customers who are then rewarded for altering their behavior to use up this inventory.

Accordingly, as recognized by the present inventors, what is needed is a system and method for automating discounts based on a customer's use of an eligible payment card that is part of a reservation program, such as a controlled-inventory management reservation program.

It is against this background that various embodiments of the present invention were developed.

SUMMARY

In light of the above and according to one broad aspect of one embodiment of the present invention, disclosed herein is a method for automatically calculating a discount for a customer offered by a merchant through a reservation system. In one example, the method may include accessing at least one reservation file relating to a reservation; accessing transaction data relating to at least one payment card transaction; comparing one or more elements of the transaction data against one or more elements of the reservation file to determine a match; and electronically calculating the discount based one or more one or more elements of the transaction data and one or more elements of the reservation file. In this way, the discount can be accurately calculated in an automatic fashion.

The reservation file may include various data content, such as a percentage discount offered by the merchant, a date of the reservation, the time of the reservation, a name of the customer, a payment card number or account number of the customer, or other data. The transaction data may include various elements, such as a payment card number or account number, a transaction amount, and other data.

In one example, the operation of electronically calculating the discount may also include calculating the discount based on a percentage discount from the reservation file and a transaction amount from the transaction data (i.e., authorization data). The method may also include issuing a credit to the customer in the amount of the discount, and issuing a debit to the merchant in the amount of the discount. In another embodiment, the customer may opt for a non-cash discount (such as airline miles, points, or other rewards), in which case the method may include providing the customer with a reward in an amount proportional to the discount.

According to another broad aspect of another embodiment of the present invention, disclosed herein is a system for automatically calculating a discount for a customer offered by a merchant using a reservation system and a payment card processing system. In one embodiment, the system may include a database storing at least one reservation file relating to a reservation, and a calculation engine for electronically calculating the discount, the calculation engine in communications with the database and the payment card processing system.

In one example, the reservation file may include a percentage discount offered by the merchant, a date of the reservation, a time of the reservation, a name of the customer, a payment card number or account number of the customer, or other data. The calculation engine may calculate the discount based on a percentage discount (obtained from the reservation file) and a transaction amount (obtained from the payment card processing system).

According to another broad aspect of another embodiment of the present invention, disclosed herein is an apparatus for automatically calculating a discount for a customer offered by a merchant using a reservation system and a payment card processing system. In one example, the apparatus includes a database storing at least one reservation file relating to a reservation, and a calculation engine for electronically calculating the discount, the calculation engine in communications with the database and the payment card processing system, the calculation engine calculating the discount based on a percentage discount obtained from the reservation file and a transaction amount from the payment card processing system. The apparatus or portions thereof may be implemented within a computer system as hardware or software or both.

In one example, the calculation engine initiates a credit to the customer in the amount of the discount and a debit to the merchant in the amount of the discount.

The features, utilities and advantages of the various embodiments of the invention will be apparent from the following more particular description of embodiments of the invention as illustrated in the accompanying drawings.

DETAILED DESCRIPTION

Embodiments of the present invention provide for automatic calculation of discounts for customers that have purchased goods or services from a merchant using an eligible payment card with a reservation system. Embodiments of the present invention may also permit for the customer to receive the discount in other forms, if desired, such as points, miles or other rewards. Various embodiments of the present invention are described herein, and may be implemented as methods, systems, apparatus or in other forms.

Generally, a customer makes a reservation with a merchant through the reservation service which offers discounts to the customer for goods or services purchased from the merchant through use of an eligible payment card. As used herein, the term "payment card" includes but is not limited to, for example, credit cards, debit cards, bank cards, store-issued cards, prepaid cards, contactless cards, or any cards that a customer can use in lieu of a cash payment, and these terms are used interchangeably herein.

A reservation file, described below, is generated and transmitted to a database for access by a discount calculation engine. After the customer completes the purchase from the merchant using an eligible payment card, the calculation engine automatically calculates the amount of the discount and generates a credit to the customer's payment card account and generates a debit to the merchant. In this way, the calculation of the discount is automatic and accurate, and can be included in the customer's payment card statements and payment card account activity summaries such as year-end summaries.

Figure 1:
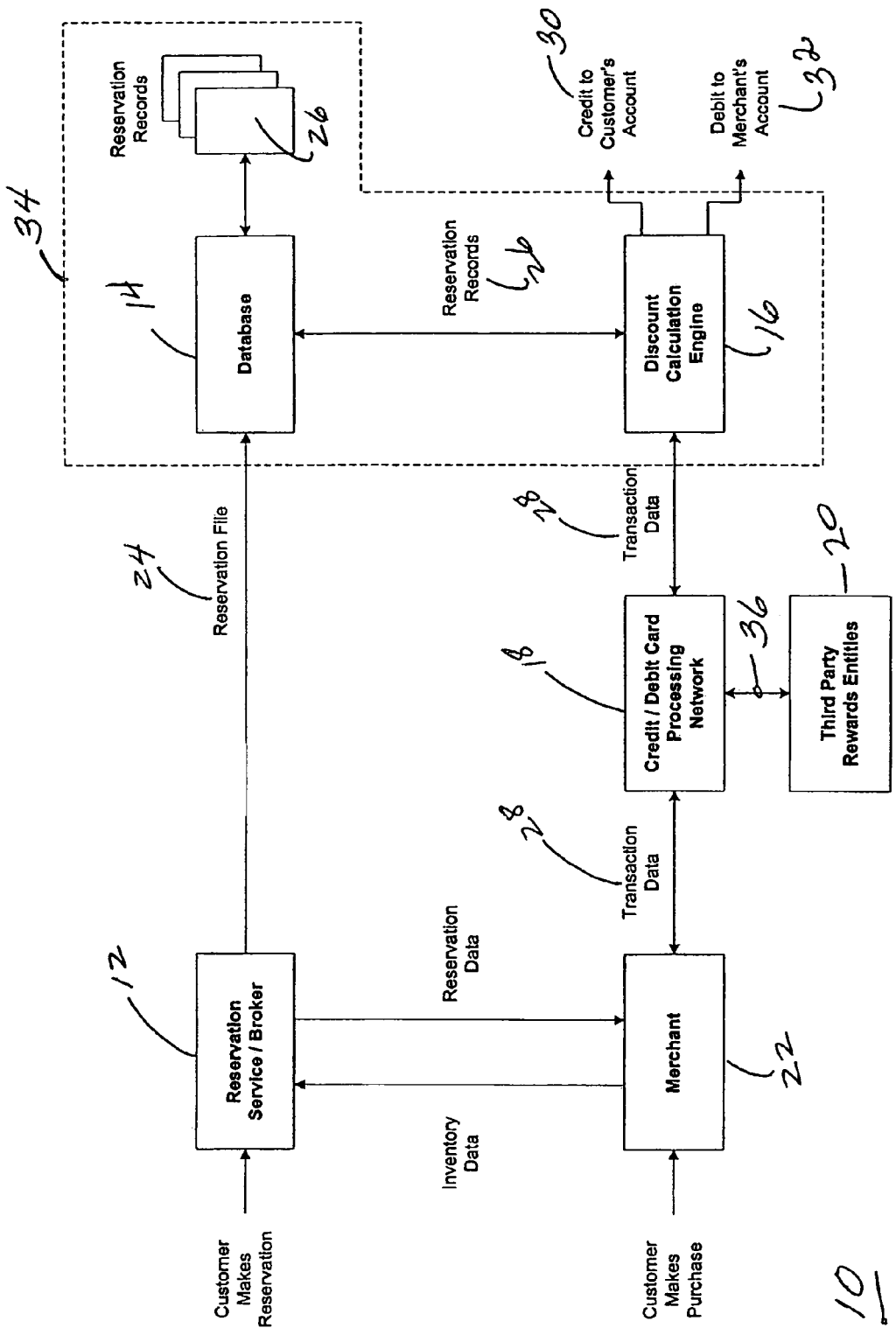
FIG. 1 illustrates a block diagram of an example of a system for providing automated discounts or rewards, in accordance with one embodiment of the present invention.

FIG. 1 illustrates an example of a block diagram for providing automated discounts for purchases from merchants using a reservation system 10, in accordance with one embodiment of the present invention. In FIG. 1, the system 10 may include a reservation service/broker 12, a database 14, and a discount calculation engine 16.

The reservation service 12 is, in one example, in communications with the database 14 which is in communications with the calculation engine 16. The calculation engine 16 is in communications with (or may be integrated into) a payment card processing network 18, which may be in communications with third party reward entities 20, if desired, such as airline mileage providers, hotel point providers, and other conventional awards or rewards providers.

The reservation service 12 may be implemented as a website, telephone service, or other service. For example, a customer or cardholder (hereinafter, "customer") may contact the reservation service 12 to make a reservation with a participating merchant 22. Merchants 22—such as providers of goods or services including but not limited to hotels, airlines, restaurants—communicate with the reservation service 12 to establish relationships and define availabilities. For example, a restaurant may establish a relationship with a reservation service 12 wherein the restaurant provides two reserved tables each day throughout the restaurant's hours of operation for reservations through the reservation service 12. The reservation service 12 may provide an automated computer interface which provides available reservations to the customer, and upon the customer making a reservation, communicates the reservation information to the merchant 22.

In one example, the reservation service 12 only provides its reservation services to eligible customers. The reservation service 12 may maintain a list of cards or card types that are eligible to receive discounts. For instance, the reservation service 12 may provide access to reservations for those customers that have particular payment cards which match a predetermined bank identification number or a predetermined type of credit, debit or payment card.

In another example, the reservation service 12 provides an enrollment option wherein a new customer can enroll to utilize the reservation service 12. The reservation service 12 may provide graphical user interfaces to set up online user profiles of the customers, for instance, including but not limited to the customer/cardholder name, password, payment card types and numbers, or other information regarding the customer. The reservation service 12 may provide a graphical user interface which gives the customer an option to select which type of reward currency the cardholder desires the discount to be provided (i.e., cash back reward, discount, points, mileage, prepaid gift cards, annual payment card fee discounts, or other rewards).

The reservation service 12 may authenticate the customer through a username and password, and may provide extra rewards if the particular customer is a frequent user of the reservation service 12. The reservation service 12 may provide the customer with loyalty points or other rewards for each use of the reservation service 12, including but not limited to up front or immediate bonus incentives such as points, miles, discounts, or other incentives.

In accordance with one embodiment of the present invention, a reservation data file 24 is sent by the reservation service 12 to the database 14 for use by the calculation engine 16. In one example, the reservation file 24 includes a cardholder information (e.g., payment card number or account number), merchant data (e.g., merchant category code, merchant name, merchant zip code), reservation information (e.g., date of reservation), and discount information (e.g., discount percentage for this reservation).

The reservation file 24 may be transmitted by the reservation service 12 to the database 14 in any conventional manner, including over wired or wireless networks capable of transmitting and receiving encrypted data. The reservation file 24 information may be transmitted in real time or may be batch processed, batch transmitted, may be pushed to the database or pulled from the reservation service, or may be transmitted in any other conventional manner.

The database 14 may be implemented using any conventional database technology. In one example, the database 14 receives the reservation file 24 information from the broker/reservation service 12, and forms one or more reservation records 26 which may include the data obtained from the reservation files 24. Each reservation record 26 may correspond uniquely to a reservation contained in a reservation file 24. The reservation record 26 may include data from the reservation file 24—such as the time and date of the reservation, the cardholder's name, card/account number, merchant name, zip code, and discount percentage. The reservation record 26 may also contain one or more fields such as a transaction amount, actual calculated discount amount, date/time stamp of the transaction. Initially, these fields may be null when the reservation record 26 is created at the database 14, and these null fields can be filled with data obtained by the calculation engine after a corresponding credit/debit/payment card transaction has been completed.

In one example, a reservation record 26 is either open or closed, and this status can be set and read by any conventional data processing technique. For instance, if the above described fields are null, then the reservation record 26 can be considered open; and when the above described fields contain non-null values, then the reservation record 26 may be considered closed. Other methods can be used to indicate whether a reservation record 26 is open or closed, such as through bits, flags, data encoding or other conventional techniques.

In one embodiment, the database 14 checks to ensure that no duplicate transactions or duplicate reservation records 26 exist therein, and if so, the duplicate entries are deleted.

In another example, a validation can be performed to check the reservation data against program participants and eligible members to ensure that only valid accounts are being provided with the discounts or awards. These reservation records 26 may then be transmitted to or otherwise made available to be read or accessed by the calculation engine 16.

The calculation engine 16 automatically calculates the discount owed to the customer, and may be implemented as a process, logic, or rules within a computing or electronic device. When the customer/cardholder utilizes the reservation and transacts business with the merchant 22 using the cardholder's eligible payment card, then payment card transaction data 28 is generated and made available to the calculation engine 16. The calculation engine 16 receives or has access to the reservation records 26 stored by the database 14, and compares the reservation record data 26 from the database 14 to the payment card transaction related data 28, in order to determine the appropriate discount to issue to the cardholder and the amount to debit the merchant's account.

In one example, the calculation engine 16 compares open reservation records 26 (i.e., records that have not yet been matched up with an actual transaction) with the transaction related data 28. For instance, the transaction data 28 may be provided from the merchant 22 to a payment card authorization network 18 involving issuers and acquirers. The payment card processing network 18 may generate authorization or clearing transaction records, as is well know in the art, including data such as a payment card number or account number, authorization amounts, merchant category codes, merchant names/zip codes, payment card authorization dates, etc.

If the calculation engine 16 is able to match a reservation record 26 stored in the database 14 against a transaction record/authorization record 28 from the credit/debit/payment card processing network 18, then a discount amount can be calculated. Assuming that the discount will be provided as a percentage of the charged amount, the discount calculation may include a determination of the lesser of the authorization amount or the clearing amount. The actual discount may be calculated as the product of the discount percentage multiplied by the lesser of the authorization amount or clearing amount. In one example, upon calculating the discount, a credit transaction 30 is created and applied to the cardholder's account. For instance, the cardholder's statement (e.g., John Smith's account) may include language such as "Dining Discount from ACME Steakhouse on Feb. 14, 2005: $12.37" based on the calculated discount amount.

The calculation engine 16 may also create a debit transaction 32 which is applied to the merchant's account. For instance, the transaction may appear on the merchant's account statement as "Dining Discount on Feb. 14, 2005 for John Smith: $12.37." Where a customer has requested that the discount be credited to the customer in the form of rewards such as airline miles, points, or other currency, the merchant may be debited the actual dollar amount of the discount, and that amount is translated into the requested reward for the customer.

The calculation engine 16 may also populate the data fields of the reservation record 26 so that the record is no longer an open record. For instance, the transaction amount, the actual calculated discount amount field, and the date/time stamp field may be populated with the data obtained by the calculation engine 16 so that these reservation records are no longer considered open.

The database 14 and calculation engine 16 may be integrated together into a computing system and may be co-located or geographically separated if desired. Moreover, the database 14 and calculation engine 16 may be integrated and operated by a single entity 34. For instance, a payment card processing company or issuing bank could offer the services of automated discount calculations by integrating one or more features of the calculation engine 16 and database 14 if desired. A payment card company or bank may also provide the reservation service or broker 12 as well, if desired.

While the credit/debit/payment card processing network 18 is shown in communications with the third party rewards entities 20 in order to provide points, miles, or other awards to the customer, it is understood that the third party rewards entities 20, in another example, may be in communication with the discount calculation engine 16, and in this example, the discount calculation engine 16 could communicate with the third party entities 20 in order to generate a reward credit to the customer based on and in proportion to the discount calculated by the discount calculation engine 16.

The discounts calculated by the calculation engine 16 may be credited to the customer's account in whatever form a particular payment card company or banks support within its network. For instance, if the payment card company or banks provide for cash back dollars, airline mileage, points, or other awards or rewards, then the particular reward can be credited to the customer's account without the need for communication with a third party reward entity 20. However, to the extent that the payment card company or banks support or promote the rewards of third party reward entities 20, such as hotel points, airline mileage, or other discounts or rewards, through the communication link 36 between the payment card processing network 18 and the third party rewards entities 20, such third party rewards can be issued to the customer.

Embodiments of the present invention may help merchants 22 manage inventory including distressed inventory or bucketed inventory. In one example, merchants 22 may identify when they need to provide discounts (such as during slower times during the day, or slower days during the week, or slower seasons of the year or other times) in order to entice more customer business or customer traffic during such slow time periods. In one example, the merchant 22 can specify different discount amounts that it is willing to offer for different reservation times. For instance, the broker/reservation service 12 can include a graphical user interface for use by the merchant 22 wherein the merchant 22 can specify the date and times when a particular discount amount will be made available. The broker/reservation service 12 can then make this information available to the customers/cardholders so that the customers are provided with incentives to make reservations during slower times for the merchant.

Through a graphical user interface the discounts may be dynamically adjusted by the merchant 22 based on a number of factors, including the time of reservations, the inventory and its characteristics (i.e., indoor versus outdoor seating, deluxe rooms versus standard rooms, etc.) and remaining availability.

In one example, a prospective discount may be indicated on the merchant's initial bill to the customer. Based on the reservation data received from the broker/reservation service 12, the merchant's billing system may utilize this information in order to communicate to the cardholder/customer that a discount is available if the customer utilizes an eligible payment card. For instance, the merchant's initial bill to the customer may state "If you use your VISA(™) card, you are entitled to a 10% discount" or other language.

Embodiments of the present invention may also provide various reporting functions. For instance, totals of the transaction amounts and the discount amounts may be provided, in graphical, numerical, or other conventional forms of reports. Further, trend analysis may be provided, such as for each merchant or groups of similar merchants, showing the discount amounts over specified periods of time, for example.

Figure 2:
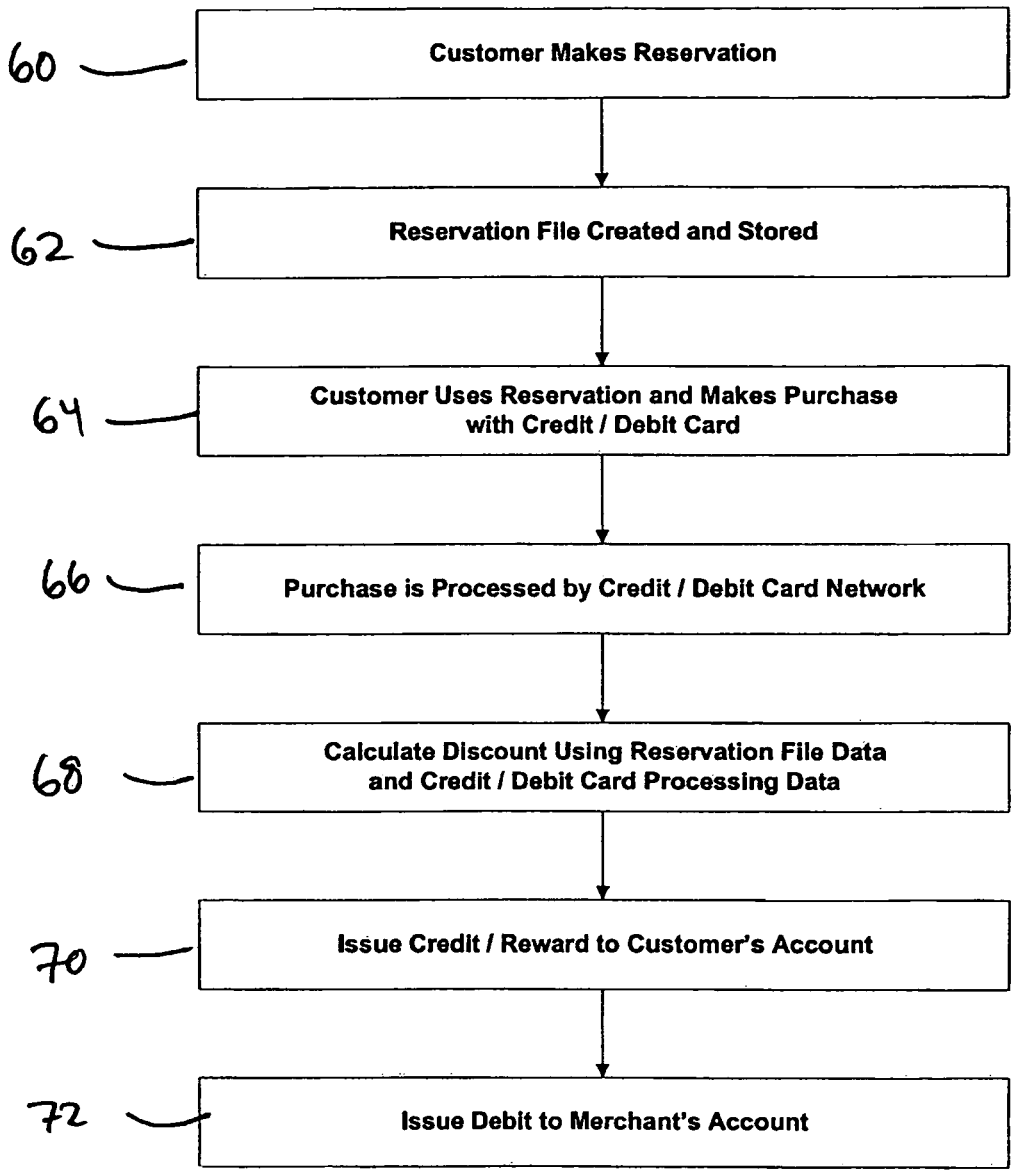
FIG. 2 illustrates an example of operations for providing automated discounts for purchases made from merchants as part of a reservation program, in accordance with one embodiment of the present invention.
Figure 8:
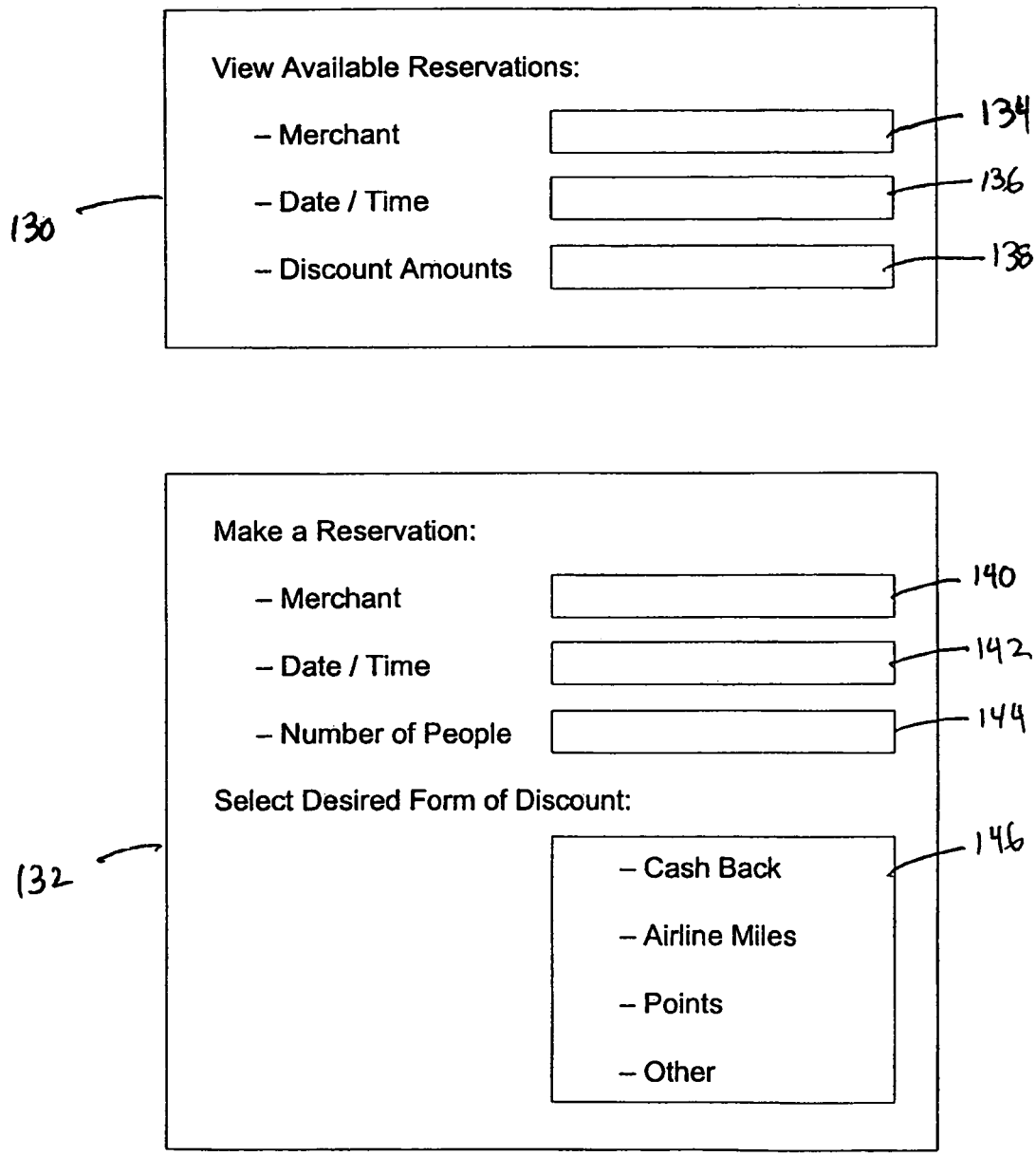
FIG. 8 illustrates examples of graphical user interfaces for permitting a customer to view available reservations, make reservations, and select a desired form of discount, in accordance with one embodiment of the present invention.

FIG. 2 illustrates an example of logical operations for providing automated discounts or rewards for purchases made from merchants as part of a reservation program, in accordance with one embodiment of the present invention. At operation 60, a customer makes a reservation, preferably using a reservation service or broker. In one example, a reservation service provides a list of merchants that the customer may select from, as well as available reservation dates (and times if appropriate) as well as the amount or percentage of discounts available for the reservation. Depending upon the type of reservation (such as a restaurant reservation, an airline reservation, a hotel reservation, or other type) the data made available to the customer by the reservation service will vary. FIG. 8 illustrates one example of a graphical user interface that may be provided for a customer by the reservation service. The graphical user interface may also provide the user with the ability to create a reservation by selecting a merchant, a date or time, the number of people or the number of units requested for the reservation, or any other piece of data that would be useful in performing the reservation. In accordance with one embodiment of the present invention, the reservation service may provide the customer with the ability to specify the desired form of the discount. For instance, the customer may request the discount in the form of cash back, airline miles, points, or other form of reward, award, or rebate.

Operation 60 may also include obtaining other information regarding the reservation including the cardholder's name and account number, the merchant's name, category code, and zip code, the discount percentage available for this particular reservation, as well as the reservation time and date.

At operation 62, a reservation file is created and stored. In one example, the reservation service creates a reservation file and transmits the reservation file to a database, such as shown in FIG. 1. The reservation file may also be transmitted or communicated to the merchant, or portions of the reservation data may be transmitted from the reservation service to the merchant. In the event that the merchant has a computing system coupled with a network, portions of the reservation data may be transmitted from the reservation service to the merchant. In a simple embodiment, the reservation service communicates the customer's name, reservation data such as date and time and number of people, to the merchant so that the merchant can make the appropriate arrangements to honor the customer's reservation.

At operation 64, the customer utilizes the reservation in order to conduct business with the merchant. In one example, the customer makes a purchase of the merchant's goods or services with a payment card eligible to provide discounts to the customer's payment card account. If the customer makes the payment with a non-eligible form of payment, then in one example, no discount will be received by the customer as is explained below (see operation 68). At operation 66, the purchase, made with an eligible payment card, is processed by a credit/debit/payment card processing network. In one embodiment, the credit/debit/payment card processing network may include any conventional system or network for processing transactions or purchases made by payment cards including but not limited to credit cards, debit cards, prepaid cards, contactless cards, or the like.

In one example, the merchant is provided with a conventional payment card processing device which is connected through a network to the payment card processing network. As shown in FIG. 1, the payment card processing network may also include or be in communications with the discount calculation engine and the database.

The payment card processing network generates processing data, including transaction data such as transaction records, authorization records, and clearing records, as is well known in the art. Embodiments of the present invention may utilize one or more of the records or data available from the payment card processing network.

At operation 68, the discount for the purchase made by the customer is automatically calculated, and preferably uses the reservation file data of operation 62 and the credit/debit/payment card processing data of operation 66. In one example, one or more portions of the reservation file data are compared to find a match to one or more portions of the credit/debit/payment card processing data so that operation 68 can automatically determine the amount of the transaction, and based on the percentage discount or other discount value indicated in the reservation file of operation 62, operation 68 can calculate the actual amounts of the discount owed to the customer based on the actual purchase made from the merchant at operation 66. If no match exists, then that means that an eligible payment card was not used for the purchase and no discount is awarded.

At operation 70, the appropriate credit or reward is issued to the customer's account. For instance, the reward may include a cash back dollar amount issued to the customer's payment card balance and reflected in the customer's account statement, or the discount may be credited or rewarded to the customer through other forms of rewards, such as airline miles, points, or any other form of reward, including those issued by third parties such as hotels, airlines, etc.

The determination of the type or form of discount given to the customer at operation 70 may be based, in one example, upon the reservation file data of operation 62, including data obtained from the customer during the reservation process of operation 60.

At operation 72, a debit is issued to the merchant's account in the amount of the discount calculated by operation 68, in one example. For instance, the discount calculated by operation 68 may be communicated to a conventional credit/debit/payment card processing network so that the merchant's credit/debit/payment card accounts reflect a debit in the amount of the discount calculated by operation 68.

Figure 3:
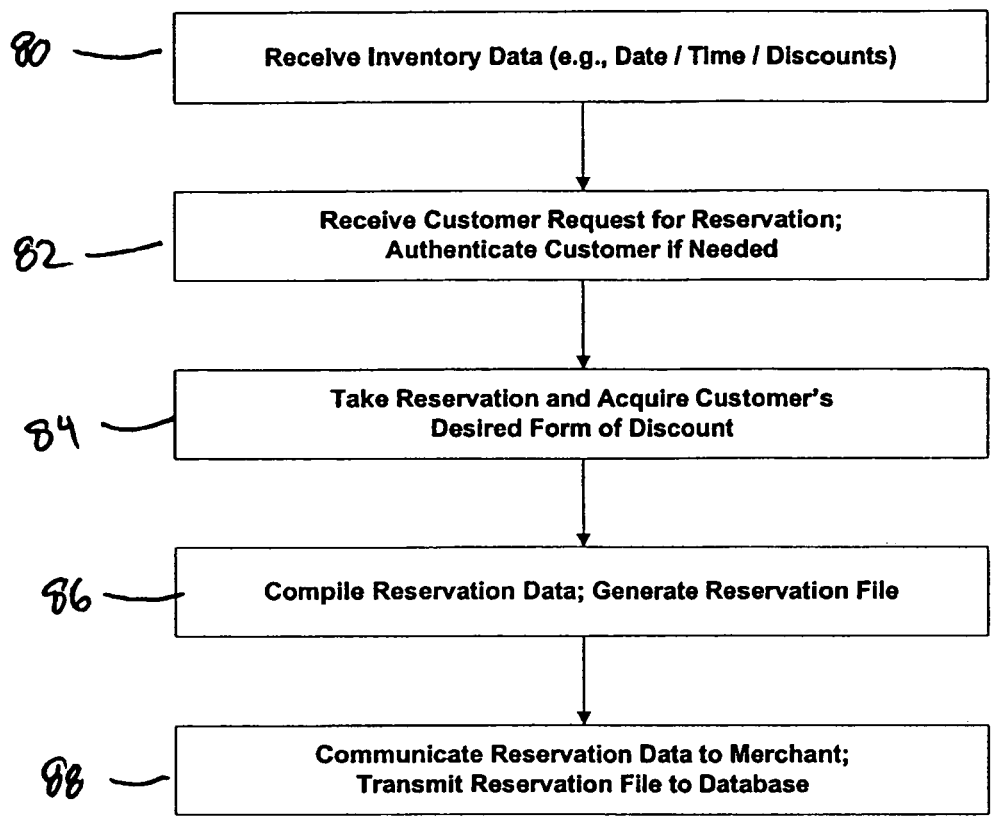
FIG. 3 illustrates an example of operations which may be performed by a reservation service or broker, in accordance with one embodiment of the present invention.
Figure 7:
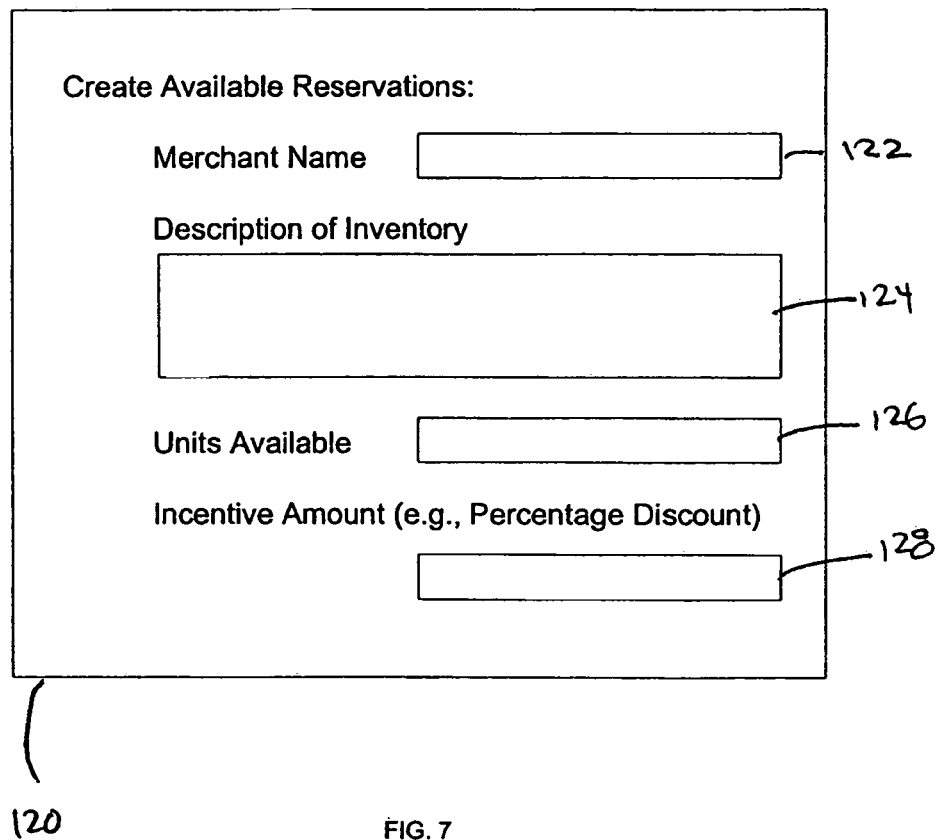
FIG. 7 illustrates an example of a graphical user interface for gathering inventory data to create available reservations from a merchant, in accordance with one embodiment of the present invention.

FIG. 3 illustrates an example of operations which may be performed a reservation service, in accordance with one embodiment of the present invention. At operation 80, the reservation service receives inventory data from merchants, including the inventory which the merchant wishes to market through the reservation service as discounted inventory. In this regard, inventory may include goods or services which the merchant provides, including, for example, but not limited to, airline seats, restaurant reservation seating and time slots, hotel rooms, rental car reservations, or other goods or services. FIG. 7, described below, illustrates an example of a graphical user interface that a reservation service may provide for a merchant to specify and describe inventory which the merchant desires to post through the reservation service for a discounted amount. Preferably, the discount offered by the merchant is available only if the customer pays for the goods or services using an eligible payment card.

At operation 82, the reservation service receives customer requests for reservations. In one example, operation 82 may include the reservation service posting or communicating to customers available reservations, goods, or services. Operation 82 may also include authenticating the customer if needed. For instance, the reservation service may require that the customer establish an account with the reservation service, the accounts including a username and password. Profiles of users may be stored and managed by the reservation service, and may include, in one example, items such as the customer name, address, contact information such as cellular phone numbers, payment card types and/or partial or full account numbers, etc. If desired, the reservation service may track the frequency of use by the customer of the reservation service, and may provide, as a separate incentive or award, points, miles, or other incentives for frequent use of the reservation service.

At operation 84, the reservation service accepts a reservation by a customer and acquires the customer's desired form of discount. Data gathered by operation 84 may include the customer's name, the date and time of the reservation, the amounts or percentage of discount which will be provided, the merchant name, as well as the customer's desired form of discount (e.g., cash back, airline miles, points, or other form of reward or discount). At operation 86, the reservation data obtained by operations 82-84 is compiled and a reservation file is generated. In one example, the reservation file includes the payment card information (e.g., payment card number or account number), customer name, merchant's name, zip code, and category code, percentage discount for the reservation, and the reservation date.

At operation 88, the reservation data is communicated to the merchant, and the reservation file is transmitted to the database. By communicating the reservation data, or portions thereof, to the merchant, the reservation service secures the reservation with the merchant on behalf of the customer. Additionally, operation 88 transmits the reservation file to the database for processing by the discount calculation engine, described below.

Figure 4:
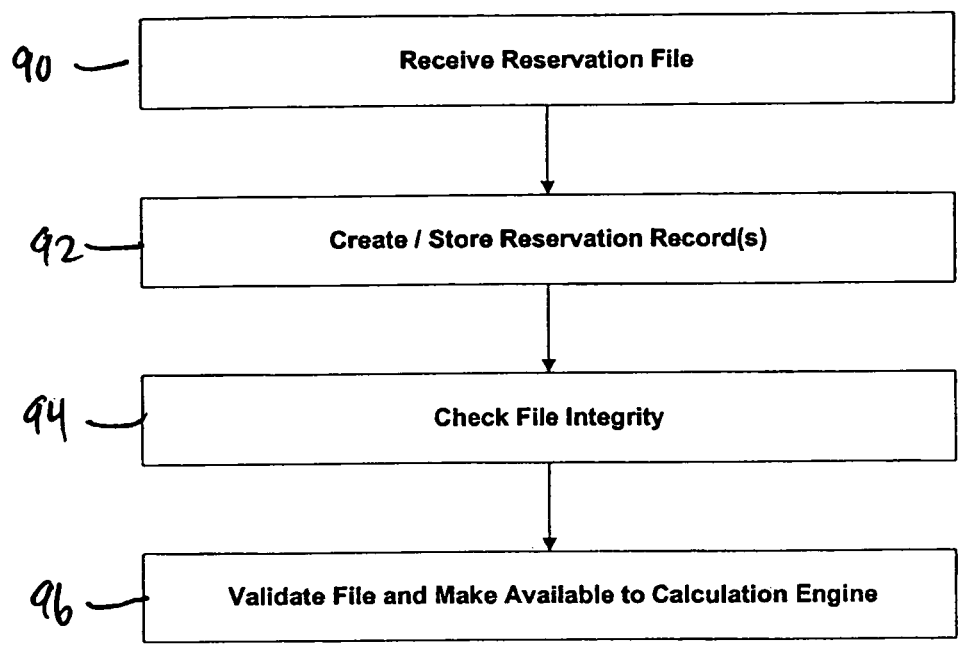
FIG. 4 illustrates an example of operations which may be performed by a database or related software or logic, in accordance with one embodiment of the present invention.

FIG. 4 illustrates an example of operations that may be performed by the database in order to provide automated discount calculations, in accordance with one embodiment of the present invention. At operation 90, the reservation file is received, and at operation 92, a corresponding reservation record is created and stored by the database. Operation 94 may check the integrity of the file, such as through conventional means using checksums or other file integrity checks, and operation 96 validates the file and makes the file available to the calculation engine. In one example, operation 96 includes determining whether a duplicate or substantially similar reservation record exists, and if so, operation 96 can delete the unneeded reservation record as needed.

Figure 5:
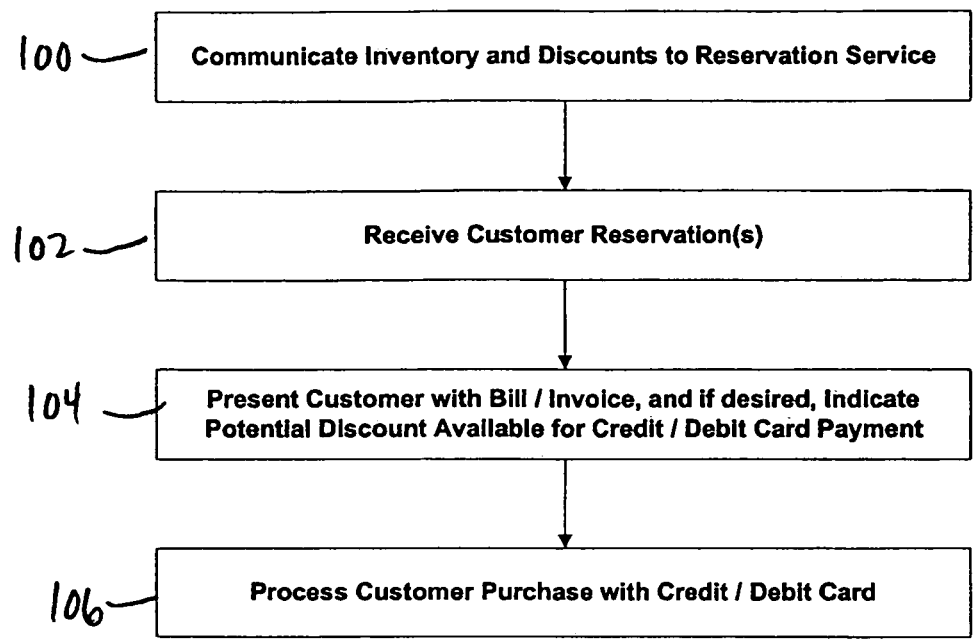
FIG. 5 illustrates an example of operations which may be performed by a merchant or a merchant's computing system, in accordance with one embodiment of the present invention.

FIG. 5 illustrates an example of operations that may be performed by the merchant in order to provide automated discount calculations, in accordance with one embodiment of the present invention. At operation 100, the merchant communicates inventory and discounts to the reservation service. For instance, the merchant may communicate information telephonically, by facsimile, or via a graphical user interface, such as may be provided by the reservation service.

FIG. 7, described below, illustrates an example of a graphical user interface which the reservation service may provide in order to obtain information from the merchant. As mentioned above, the merchant's inventory may include products or services which the merchant wishes to make available and market through the reservation service. These products or services may include, but are not limited to, hotel reservations, restaurant reservations, airline reservations, rental car reservations, or other goods or services. In one example of operation 100, the merchant provides varying discounts of its goods or services based upon the merchant's desire to motivate customers to purchase such goods or services. For instance, a restaurant may provide a 25% dining discount for reservations made on Monday afternoon from the times of 5 P.M. to 6 P.M., and provide a 10% dining discount for reservations made for Saturday night between 7 P.M. and 8 P.M. In this example, the merchant provides a deeper discount for the Monday early evening dinner reservation in order to generate business during this otherwise slow time.

At operation 102, the merchant receives customer reservations. When the customer arrives and purchases goods or services, then at operation 104 the merchant presents the customer with the bill or invoice. In one example, the merchant may generate a bill which indicates that a discount is available (e.g., a prospective discount) if the customer utilizes an eligible payment payment card for payment of the bill/invoice. This indication may act as a reminder to the customer that, in order to receive the discounts indicated by the reservation service when the customer made the reservation, the customer must pay using the appropriately eligible payment card. It is understood, however, that indication of the potential discount of operation 104 is optional and may be included or omitted by the merchant, depending upon the particular implementation.

At operation 106, the merchant processes the customer's purchase with the customer's payment card. Operation 106 may be performed using any conventional payment card processing system.

Figure 6:
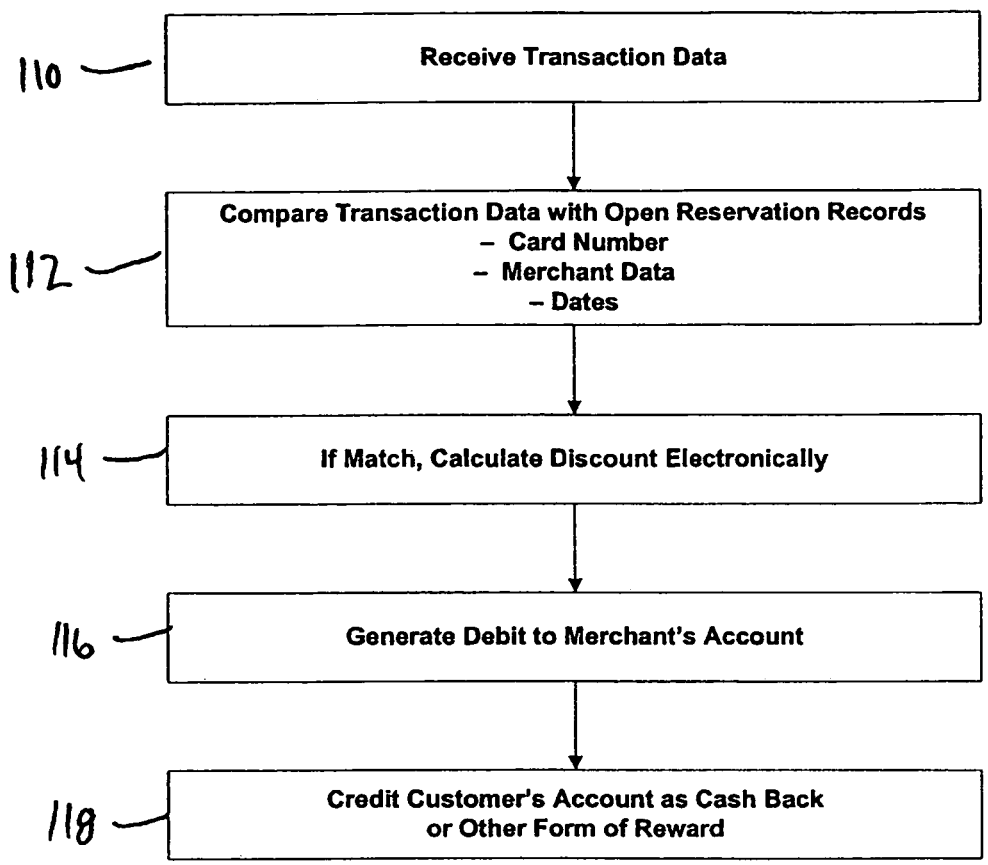
FIG. 6 illustrates an example of operations which may be performed by a discount calculation engine to automatically calculate a discount or reward, in accordance with one embodiment of the present invention.

FIG. 6 illustrates an example of operations which may be performed by a calculation engine in order to automatically calculate discounts or rewards for purchases made, in accordance with one embodiment of the present invention. At operation 110, a calculation engine receives or has access to transaction data, preferably from a payment card processing network. As described above, the transaction data may include authorization data, clearing data, or transaction records or other information provided by a credit/debit/payment card processing network. At operation 112, the calculation engine may compare the transaction data received at operation 110 with open reservation records made available in the database. Operation 112 seeks to find a match between one or more portions of the transaction data and the appropriate open reservation record. In one example, operation 112 compares the payment card number or account number, transaction date, and merchant's data (e.g., merchant's category, merchant's name, or merchant's zip code) of a transaction to the corresponding data fields of the open reservation records in order to find a match. Other comparisons can be used as well for the purpose of finding a match between a reservation record and an eligible payment card transaction, depending upon the particular implementation.

If no match is found, no discount is calculated or rewarded. If a match is found, operation 114 calculates the discount electronically. In a simple example, operation 114 calculates the actual discount as the discount percentage (contained within the reservation record) multiplied by the transaction amount (obtained from the transaction data). Hence, the actual discount dollar value has been calculated.

In situations where the transaction data includes an authorization amount as well as a clearing amount, operation 114 may also include a determination of the lesser of the authorization amounts or clearing amount, and the actual discount dollar amount may be based upon the lesser of the authorization amount or the clearing amount, in one example.

Having calculated electronically the discount amount, operations 116-118 generate the appropriate credits and debits to the customer's and merchant's accounts. These credits and debits can be effectuated utilizing conventional credit/debit/payment card processing techniques, for instance, operation 116 can generate a debit to the merchant's account in the amount calculated by operation 114. Operation 118 generates credits to the customer's account in the amount of the discount calculated by operation 114. In one example, the customer's payment card account is credited, or in another example, the customer is rewarded with other forms of rewards such as airline miles, points, or other rewards or incentives, for instance as specified by the customer's requests as acquired by operation 84 of FIG. 3. Operation 118 may communicate a dollar amount to a third party reward entity, and the third party reward entity may calculate the appropriate amount of reward which will be provided to the customer in exchange for the dollar amount. Or, if desired, the discount calculation engine may include one or more modules for converting the discount calculated by operation 114 into the appropriate or proportional amounts of airline miles, points, or other rewards that the customer desires.

In one example, because operation 118 may generate a credit to the customer's credit/debit/payment card account in the amount of the discount, such a credit may be reflected upon the customer's payment card statement as an award or cash back for purchasing goods or services from the merchant using the reservation service.

FIGS. 7-8 illustrate examples of graphical user interfaces that may be provided by a reservation service, in accordance with one embodiment of the present invention. It is understood that these FIGS. 7-8 are provided as examples only and that various embodiments of the present invention may or may not include one or more features shown therein. In FIG. 7, a graphical user interface may be provided for merchants to create or post reservations. In one example, a display screen 120 may include a field 122 for specifying or displaying a merchant name, and may also include a field for the merchants to describe the inventory being made available for reservation or use to customers. A field 126 may be provided for the merchant to specify the number of units available. A field 128 may be provided for permitting the merchant to specify the incentive amount, such as a percentage discount. Other fields may be provided as well depending upon the implementation, including but not limited to, date and time fields.

Using the graphical user interface 120, a merchant can create or post a number of goods or services available for reservation or use by customers through the reservation service. Preferably, the discount indicated in field 128 is only available to the customer if the customer uses an eligible credit/debit/payment card.

FIG. 8 illustrates two examples of graphical user interfaces 130, 132 for use by customers in making reservations through the reservation service. Sample display screen 130 may include a display of available reservations, which may include a section 134 for displaying merchants participating in the reservation service, a section 136 for displaying the dates/times of available reservations, and a section 138 for indicating the discount amounts available for the particular open reservations. It is understood that other display fields may be included, for instance, fields describing the goods or services available for reservation use or by a particular merchant.

Example display screen 132 can be utilized to provide a customer with the ability to make or book a reservation. Display screen 132 may include a section 140 for the customer to specify a particular merchant with which the customer wishes to make a reservation; a section 142 for the customer to specify a date/time for a reservation; and a section 144 for a customer to specify the number of people or number of units involved in the reservation. A section or field 146 may be provided, such as a dropdown menu, which permits the customer to select the desired form of the discount, such as cash back, airline miles, points, or other rewards.

In another embodiment of the invention, a discount value proposition sales method may be used in which the merchant is held to a discount off of the net bill (excluding tax, tip, etc.) while the cardholder is given a lower discount off the gross bill (including tax and tip, etc.). For instance, an embodiment of the invention could be formed where merchants could pay the discount in the form of 20% off the net bill, and cardholders could be charged 15% of the gross bill, so that merchants actually only pay the full 20% discount a fraction of the time. Alone or in combination with other features described herein, this formulation may be beneficial in marketing an automated discount program to merchants.

In another embodiment of the invention, automated discounts may be offered by merchants as standing discounts that are automatically available to eligible payment cardholders, such as those in an enrolled payment card program. The standing discounts can be applicable to certain days of the week or month, times within a day, or may apply all days or all times if desired. For example, all payment cards of Chase™ Disney™ cards can be enrolled for a family dining program that would give 25% off at certain restaurants on Mondays and Tuesdays, and the automated discounts could be provided by the payment card processing system and/or statement credits.

In this example, the payment card processing system could match transactions from the participating merchant to enrolled cards. This would allow a merchant to offer any specific payment card-type to receive certain discounts based on enrollment with no tie to a specific personalized reservation or without effort/expense of merchant to grant access to any additional third parties to see payment card transactions in order to operate an enrolled card program.

Accordingly, it can be seen that embodiments of the present invention provide for the automatic calculation of discounts or rewards for purchases made by a customer from merchants as part of a reservation program.

It is understood that one or more of the operations shown in FIGS. 2-6, as well as one or more of the portions of the graphical user interfaces of FIGS. 7-8, may be utilized in a system such as but not limited to the system of FIG. 1. It is also understood that one or more of the operations of FIGS. 2-6 or one or more of the features of FIGS. 7-8 may be incorporated into a system for providing automated discounts or rewards, wherein such system is different than the system of FIG. 1.

Through the automation of the calculation and awarding of discounts or other awards, the risk of human error (such as errors that may be introduced by the merchant during the calculation of discounts) is significantly reduced. Moreover, the time required by a merchant to process a transaction is reduced, since the burden of calculating the actual discount is automatically performed by the calculation engine as opposed to the merchant, thereby improving the merchant's efficiency of transaction processing and overall satisfaction of merchant's customers.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed inventions require more features than are expressly recited in each claim. Rather, as the following claims reflect, inventive aspects lie in less than all features of a single foregoing disclosed embodiment, and each embodiment described herein may contain more than one inventive feature.

While the invention has been particularly shown and described with reference to embodiments thereof, it will be understood by those skilled in the art that various other changes in the form and details may be made without departing from the spirit and scope of the invention.

What is claimed is:

1. A method comprising:

providing, by a transaction handler computing device via a reservation service user interface, an offer for a prospective reward from a merchant to a consumer along with a plurality of reward currencies for the reward for selection by the consumer, wherein the offer is associated with merchant defined eligibility criteria comprising at least a consumer payment account attribute to be associated with a purchase transaction to qualify for the reward and wherein the reward is a monetary value to be credited upon completion of the qualifying purchase transaction;

receiving, by the transaction handler computing device, a reservation made by the consumer for a qualifying purchase from the merchant along with the consumer's choice of one of the plurality of reward currencies, wherein the reservation is at least partially in response to the offer for the reward, wherein the qualifying purchase transaction is to be completed within a specified time limit using a consumer payment device identifying a consumer payment account of the consumer associated with the consumer payment account attribute;

causing, by the transaction handler computing device, the merchant to generate at a time of the qualifying purchase, a bill reminding the consumer that the reward is prospectively available with use of the consumer payment device for completing the qualifying purchase transaction;

processing, by the transaction handler computing device, authorizations of a plurality of payment transactions identifying respective consumer payment accounts of the customers;

comparing, by the transaction handler computing device, each transaction of the payment transactions to find a match to the qualifying purchase conforming to the reservation and the merchant defined eligibility criteria;

identifying, by the transaction handler computing device, the consumer payment account based on the match;

calculating, by the transaction handler computing device, the monetary value of the reward based on a transaction amount corresponding to the qualifying purchase identified via the match;

crediting, by the transaction handler computing device, the monetary value of the reward in terms of the consumer's form of choice to the consumer.

2. The method of claim 1, further comprising:

receiving, by the transaction handler computing device, for each qualifying transaction, a description of the corresponding one of a reserved good and a reserved service.

3. The method of claim 1, further comprising:

receiving, by the transaction handler computing device, a profile of the consumer, acknowledging, by the transaction handler computing device, the offer and including, by the transaction handler computing device, information selected from the group consisting of:
- a name of the consumer;
- an indicator of the consumer payment account of the customer;
- a password for access to the profile; and
- a selection of a form of the reward.

4. The method of claim 1, further comprising:
transmitting, by the transaction handler computing device, in response to the match, a notice to the customer, the notice including a description of the monetary value of the reward as calculated.

5. The method of claim 1, wherein the merchant is a restaurant operator.

6. The method of claim 1, wherein:
the transaction handler computing device is configured to communicate with at least an issuer and an acquirer to perform the authorization function;
the issuer issues to the consumer the consumer payment account;
the merchant submits a first transaction made using the consumer payment account to the acquirer;
a payment for the first transaction is obtained from the issuer from the consumer payment account; and
the issuer forwards the payment to the acquirer to pay the merchant for the first transaction.

7. The method of claim 1, wherein each transaction includes at least one of:
- an identifier of a consumer payment account;
- a description of one of a good and a service;
- a date of the transaction; and
- an identifier of a merchant.

8. The method of claim 1, wherein the reservation includes at least one of the following:
- an identifier of the consumer payment account;
- an indication of the reward;
- a date for the qualifying purchase transaction;
- a pre-determined window of time for the qualifying purchase transaction; and
- an identifier of the merchant.

9. The method of claim 1, wherein a type of the reward currency is selected by the consumer from the group consisting of:
- redeemable points;
- airline miles applicable towards a future airline trip;
- a rebate;
- a good; and
- a service.

10. The method of claim 1, wherein the reservation is confirmed to the consumer on an initial bill to the consumer for the one of the reserved good and the reserved service.

11. The method of claim 10, wherein the reservation as confirmed identifies a value for the reward.

12. The method of claim 1, wherein the reward comprises a discount applied towards a net bill of the qualifying purchase transaction.

13. The method of claim 1, wherein the reward comprises a discount applied towards a gross bill for the qualifying purchase transaction.

14. The method of claim 1, further comprising: sending to the merchant a report rendering a trend analysis of a plurality of qualifying purchase transactions.

15. The method of claim 1, further comprising:
sending, via the transaction handler computing device, a plurality of offers to the consumer; and
receiving, via the transaction handler computing device, at least one reservation corresponding to an acceptance of at least one of the plurality of offers by the consumer and an identifier of the consumer payment account of the consumer.

16. The method of claim 1, further comprising:
sending, via the transaction handler computing device, a reminder to the consumer that a subsequent transaction can be a qualifying purchase transaction.

17. The method of claim 1, wherein the consumer makes a reservation with the merchant through a reservation service.

18. The method of claim 1, wherein the consumer payment account attribute, based on which the merchant defined eligibility criteria are specified, is an account type.

19. A system comprising:
a transaction handler computing device having hardware and software configured to:
provide via a reservation service user interface, an offer for a prospective reward from a merchant to a consumer along with a plurality of reward currencies for the reward for selection by the consumer, wherein the offer is associated with merchant defined eligibility criteria comprising at least a consumer payment account attribute to be associated with a purchase transaction to qualify for the reward and wherein the reward is a monetary value to be credited upon completion of the qualifying purchase transaction;
receive a reservation made by the consumer for a qualifying purchase from the merchant along with the consumer's choice of one of the plurality of reward currencies, wherein the reservation is at least partially in response to the offer for the reward, wherein the qualifying purchase transaction is to be completed within a specified time limit using a consumer payment device identifying a consumer payment account of the consumer associated with the consumer payment account attribute;
cause the merchant, at a time of making the qualifying purchase, to generate a bill that comprises a reminder to the consumer that the reward is prospectively available with use of the consumer payment device for completing the qualifying purchase transaction;
process authorizations of a plurality of payment transactions, wherein the payment transactions between merchants and customers are performed utilizing consumer payment devices identifying respective consumer payment accounts of the customers;
compare each transaction of the payment transactions to find a match to the qualifying purchase conforming to the reservation and the merchant defined discount criteria;
identify the consumer payment account based on the match;
calculate the monetary value of the reward based on a transaction amount corresponding to the qualifying purchase transaction identified via the match; and
credit the monetary value of the reward in terms of the consumer's form of choice to the consumer.

20. A non-transitory tangible machine readable medium, storing instructions, the instructions, when executed by a computing device causing the computing device to perform a method, the method comprising:
providing an offer for a prospective reward from a merchant to a consumer along with a plurality of reward currencies for the reward for selection by the consumer, wherein the offer is associated with merchant defined eligibility criteria comprising at least a consumer payment account attribute to be associated with a purchase transaction to qualify for the reward and wherein the reward is a monetary value to be credited upon completion of the qualifying purchase transaction;

receiving a reservation made by the consumer for a qualifying purchase from the merchant along with the consumer's choice of one of the plurality of reward currencies, wherein the reservation is at least partially in response to the offer for the reward, wherein the qualifying purchase transaction is to be completed within a specified time limit using a consumer payment device identifying a consumer payment account of the consumer associated with the consumer payment account attribute;

causing the merchant, at a time of making the qualifying purchase, to generate a bill that comprises a reminder to the consumer that the reward is prospectively available with use of the consumer payment device for completing the qualifying purchase transaction;

processing authorizations of a plurality of payment transactions identifying respective consumer payment accounts of the customers;

comparing each transaction of the payment transactions to find a match to the qualifying purchase conforming to the reservation and the merchant defined eligibility criteria;

identifying the consumer payment account based on the match;

calculating the monetary value of the reward based on a transaction amount corresponding to the qualifying purchase identified via the match;

crediting the monetary value of the reward in terms of the consumer's form of choice to the consumer.

* * * * *